United States Patent [19]

Edwards

[11] Patent Number: 4,936,596
[45] Date of Patent: Jun. 26, 1990

[54] DETACHABLE AUXILIARY LOAD-CARRYING APPARATUS FOR MOBILE EQUIPMENT

[76] Inventor: John W. Edwards, P.O. Box 1151, Brandon, Fla. 33511

[21] Appl. No.: 280,180

[22] Filed: Dec. 5, 1988

[51] Int. Cl.$^5$ .............................................. B62D 53/06
[52] U.S. Cl. ................................. 280/404; 280/402; 280/81.1
[58] Field of Search ...................... 280/81.1, 402, 404, 280/DIG. 8

[56] References Cited

U.S. PATENT DOCUMENTS

| | | | |
|---|---|---|---|
| 1,770,583 | 7/1930 | Reid | 280/112.1 |
| 3,485,505 | 12/1969 | Schmidt | 280/81.1 |
| 3,702,661 | 11/1972 | Berry, Jr. | 280/404 |
| 3,801,132 | 4/1974 | Haynie et al. | 280/404 |
| 4,146,243 | 3/1979 | Sims | 280/81.1 |
| 4,200,305 | 4/1980 | Eubank | 280/404 |
| 4,226,437 | 10/1980 | Trudeau | 280/405.1 |
| 4,350,358 | 9/1982 | Ferris | 280/81.1 |
| 4,434,994 | 3/1984 | Pepin | 280/404 |
| 4,705,133 | 11/1987 | Christenson et al. | 180/209 |
| 4,762,421 | 8/1988 | Christenson et al. | 366/54 |

Primary Examiner—Kenneth R. Rice
Attorney, Agent, or Firm—Oliff & Berridge

[57] ABSTRACT

A detachable auxiliary load-carrying apparatus for mobile equipment includes first frame structure fixed to the mobile equipment, second frame structure detachably connectable to the first frame structure and having at least one pair of wheels rotatably mounted thereon, a rod and retaining pin for detachably connecting the first frame structure to the second frame structure, and a frame tilting hydraulic ram on the mobile equipment for varying the distribution of weight between wheels on the mobile equipment and the wheels on the second frame structure by tilting a rearward portion of the mobile equipment. The apparatus further includes a member fixed under the rearward portion of the mobile equipment for pivotably supporting the rearward portion of the mobile equipent on the second frame structure, and one or more steel plates on opposing sides of the second frame structure for holding the pivotably supporting member above the second frame structure. When the first and second frame structures are connected to one another, the frame tilting hydraulic ram may be operated to variably tilt the rearward portion of the mobile equipment and thereby vary the load distribution between the wheels on the mobile equipment and the wheels on the second frame structure.

13 Claims, 3 Drawing Sheets

DETACHABLE AUXILIARY LOAD-CARRYING APPARATUS FOR MOBILE EQUIPMENT

BACKGROUND OF THE INVENTION

The present invention relates to an auxiliary loadcarrying apparatus which may be utilized in conjunction with mobile equipment when the mobile equipment is being towed on the highway, or may be detached from the mobile equipment when the mobile equipment is being utilized in the field. The detachable auxiliary load-carrying apparatus of the present invention permits mobile equipment to be transported down the highway between job sites in compliance with state and federal weight distribution regulations (i.e., load per axle and load per axle per unit displacement between axles).

Mobile equipment, such as used in agriculture, construction, and the like, is often bulky and complicated, with weight distribution which is perfectly acceptable for utilization of the mobile equipment in the field but not acceptable when the mobile equipment is being towed on the highway. An example of such mobile equipment is mobile equipment for uprooting vegetation from the ground, disclosed in U.S. Pat. No. 4,602,686 (fully incorporated herein by reference) and depicted in FIG. 1 herein. As shown in FIG. 1, the mobile equipment 1 includes a frame 2 with a forward end 3 and a rearward end 4 respectively provided with front and rear wheels 5 and 6 (one of each depicted in FIG. 1). A hitch 7 typically is connected to the frame 2 by means of a goose-neck portion 8 so that the mobile equipment may be towed in the field during use and on the highway between job sites.

The above-described mobile equipment for uprooting vegetation is provided with an uprooting mechanism 9, for uprooting vegetation 10, driven by a source of power 11. The vegetation uprooted by the uprooting mechanism 9 is received on the first end 12 of a soil separating mechanism 13, and moves upwardly away from the uprooting mechanism 9 towards a second end 14 of soil separating mechanism 13 and into a collecting container 15. The collecting container 15 includes hinges 16 and one or more operator controlled hydraulic rams 17 pivotably connected to the frame 2 and the collecting container 15 such that operation of the hydraulic rams 17 is controlled to periodically discharge uprooted vegetation from collecting container 15. One or more operator controlled hydraulic rams 18 extend between the forward end 3 and the rearward end 4 of the frame 2 for controllably tilting the rearward end 4 of the frame 2 relative to the forward end 3 and the ground. During operation in the field, the frame tilting hydraulic rams 18 are operated to engage uprooting mechanism 9 deeply into the soil when deeply-embedded root systems are to be removed from the ground, and to lift uprooting mechanism 9 off of the ground when the mobile equipment is being turned around between uprooting operations.

Although certain types of operator-controlled auxiliary load-carrying apparatuses are known, they tend to be unsuitable for use in conjunction with mobile field equipment such as discussed above, or unduly complicated. For example, U.S. Pat. No. 4,350,358 discloses an auxiliary load-carrying apparatus for a self-transit concrete mixer truck which must be permanently mounted upon the truck along with a complicated arrangement of levers, hinges and hydraulic cylinders. Other similar apparatuses require similar complicated arrangements for distributing the load between wheels.

Thus, despite the existence of auxiliary load-carrying apparatuses generally, there remains a need for such an apparatus which can be suitably utilized in conjunction with mobile field equipment, which is simple to construct and utilize, and which readily may be detached from the mobile equipment during use of the mobile equipment in the field.

SUMMARY OF THE INVENTION

Accordingly, the present invention has been developed to overcome the foregoing shortcomings of existing auxiliary load-carrying apparatuses.

It is therefore an object of the present invention to provide an auxiliary load-carrying apparatus for mobile field equipment which may be simply, efficiently and effectively constructed and utilized in conjunction with mobile field equipment so as to distribute the weight of the equipment during highway transportation in order to comply with state and federal load distribution regulations.

It is yet another object of the present invention to provide an auxiliary load-carrying apparatus for mobile field equipment which readily may be detached from the mobile equipment when the mobile equipment reaches the job site and is ready for field use.

Thus, in accordance with one aspect of the present invention, the shortcomings of existing auxiliary load-carrying apparatuses are overcome by a detachable auxiliary load-carrying apparatus comprising first frame structure fixed to the mobile equipment; second frame structure detachably connectable to the first frame structure and having at least one pair of wheels mounted thereon; means for detachably connecting the first frame structure to the second frame structure; and means on the mobile equipment for varying the distribution of weight between wheels on the mobile equipment and wheels on the second frame structure by tilting a portion of the mobile equipment.

In accordance with another aspect of the present invention, the auxiliary load-carrying apparatus further comprises means for pivotably supporting a portion of the mobile equipment on the second frame structure.

In accordance with yet another aspect of the present invention, the weight distribution varying means is at least one hydraulic ram extending between forward and rearward portions of the mobile equipment.

In accordance with still another aspect of the present invention, the first and second frame structures are provided with corresponding holes, and the detachably connecting means is rod which is passed through the holes and retained in place a with a retaining pin.

In accordance with yet still another aspect of the present invention, the auxiliary load-carrying apparatus further includes means for holding the pivotably supporting means above the second frame structure.

In accordance with yet a further aspect of the present invention, the auxiliary load-carrying apparatus further includes means for maintaining a tilt position of the tilted portion of the mobile equipment.

Still further aspects of the present invention include a channel member utilized for the pivotably supporting means, at least one steel plate mounted on each side of the second frame structure and serving as the holding means, and a first frame structure which conforms in shape to and partially surrounds a portion of the second frame structure for ease of attachment and detachment.

These and other aspects and advantages of the present invention are described in or apparent from the following detailed description of the preferred embodiments.

BRIEF DESCRIPTION OF THE DRAWINGS

The preferred embodiments are described with reference to the drawings in which.

DESCRIPTION OF THE PREFERRED EMBODIMENTS

Referring to FIGS. 2-6, a detachable auxiliary load-carrying apparatus in accordance with the present invention will now be described.

Figure 1:
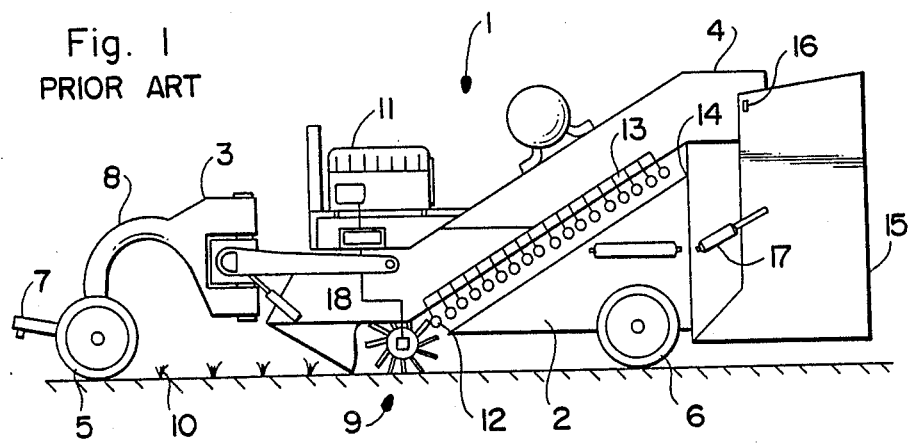
FIG. 1 is an elevation view of conventional mobile equipment for uprooting vegetation from the ground.
Figure 2:
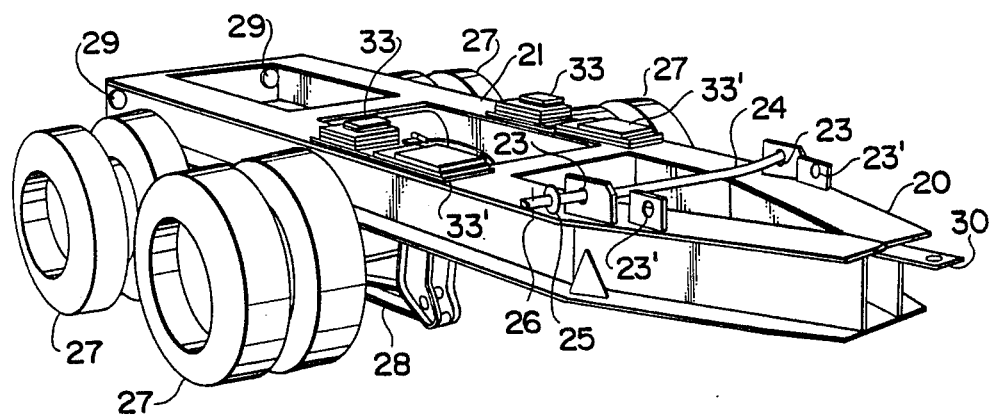
FIG. 2 is a perspective view of a detachable portion of the auxiliary load-carrying apparatus of the present invention.
Figure 3:
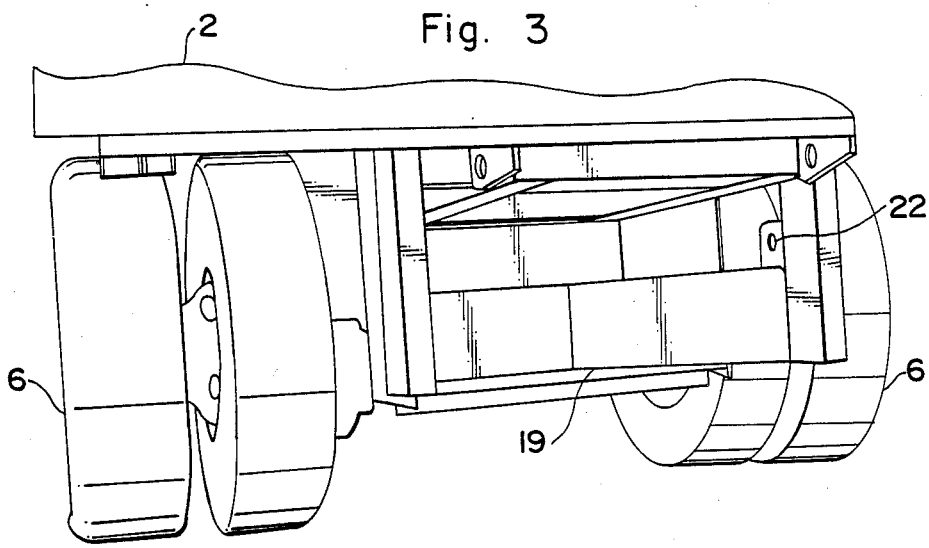
FIG. 3 is a perspective view of another portion of the auxiliary load-carrying apparatus of the present invention fixed to the mobile equipment.

As depicted in FIGS. 2 and 3, a first frame structure 19 is fixed to frame 2 of the mobile equipment substantially between rear wheels 6. The first frame structure 19 conforms in shape to and partially surrounds the forward end 20 of a second, detachable frame structure 21, the first frame structure and the forward end of the second frame structure preferably being tapered, to facilitate alignment of the first and second frame structures. The first and second frame structures 19 and 21 include oppositely located holes 22 (only one depicted in FIG. 3) and 23 aligned for receipt of a rod 24 for attaching the detachable second frame structure 21 to the fixed first frame structure 19. A second set of oppositely located holes 23' also may be provided on second frame structure 21 to permit longitudinal adjustment of second frame structure 21 vis-a-vis first frame structure 19 on the mobile equipment, or to adapt second frame structure 21 for use with various types of mobile equipment. Similar additional holes 22, may be provided on first frame structure 19 as well (see FIG. 4). The rod 24 is provided with a hole at one end, and a washer 25 and retaining pin 26 are provided for retaining the rod in position in a conventional manner.

The detachable second frame structure includes at least one wheel 27 rotatably mounted on each of opposite sides thereof. Preferably, the second frame structure includes four pairs of wheels 27 rotatably mounted to the second frame structure by means of conventional associated axle assemblies (not shown), springs 28 and/or shock absorbers (not shown). The detachable second frame structure is also equipped with reflectors or lights 29 as necessary to comply with highway regulations, and a hitch 30 which can be utilized for towing the second frame structure when detached from the mobile equipment.

Figure 4:
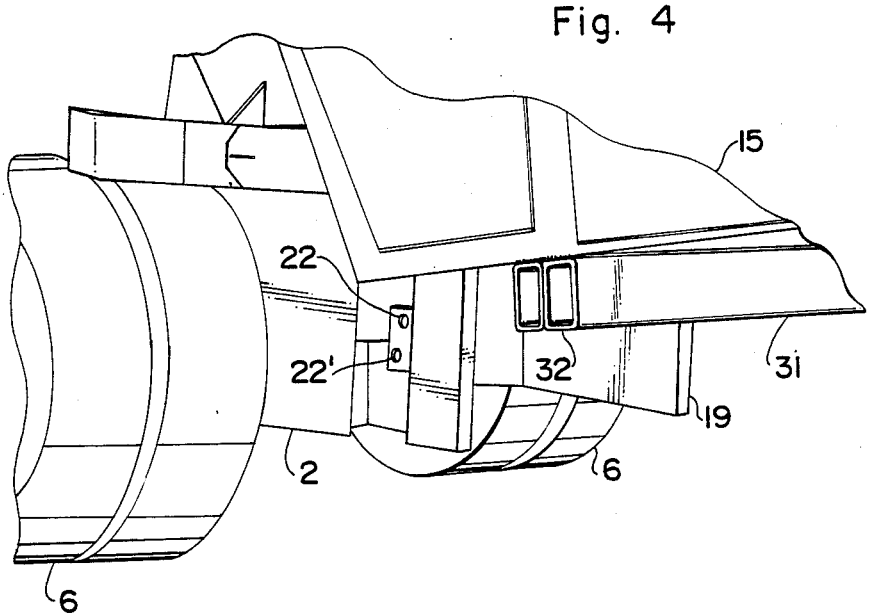
FIG. 4 is a perspective view of a pivotable supporting member of the present invention for pivotably supporting a portion of the mobile equipment.
Figure 5:
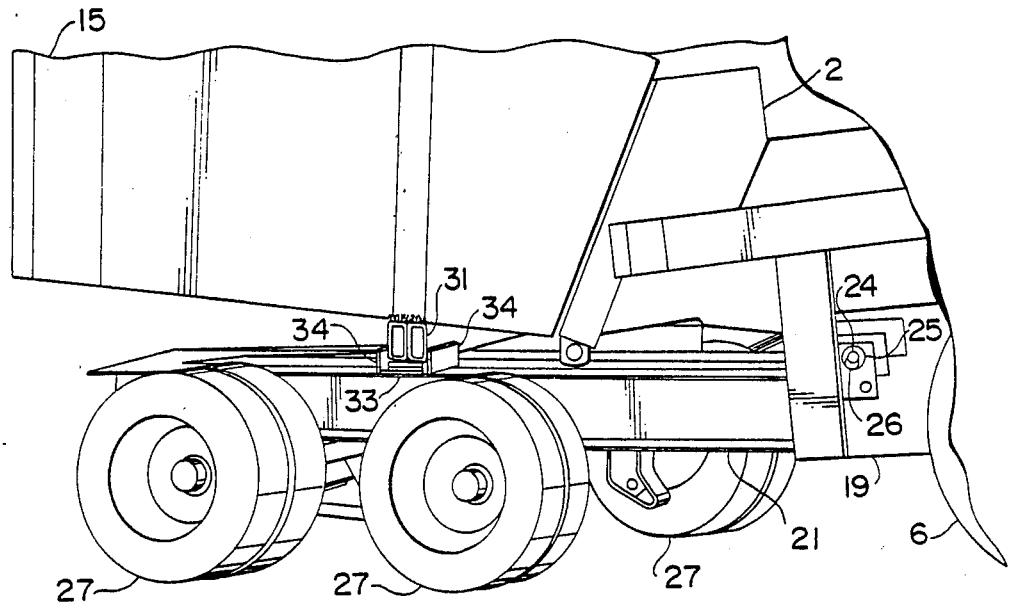
FIG. 5 is a perspective view of the auxiliary loadcarrying apparatus of the present invention fully attached to the mobile equipment.

As seen in FIG. 4, a member 31 is fixed to the underside of collecting container 15 by welding or other conventional means. The member 31 may be comprised of one or more rectangular steel channels as depicted or any other structural members designed to provide a protruding surface area 32. As best seen in FIG. 5, member 31 serves to pivotably support the rearward portion of the mobile equipment including collecting container 15 on the second frame structure when the second frame structure is connected in place to the first frame structure.

As further depicted in FIGS. 2 and 5, one or more steel plates 33 are mounted on each side of detachable second frame structure 21 for holding member 31 atop thereof above the second frame structure for reasons more fully described below. One or more additional steel plates 33' may be mounted on each side of second frame structure 21 forwardly of steel plates 33 for holding member 31 if the second frame structure is positioned more rearwardly with respect to member 31. Brackets 34 or additional steel plates higher than plates 33 and 33, may be provided on each longitudinal side of plates 33 and 33' to longitudinally retain member 31 and thereby safely prevent the second frame structure from becoming unintentionally detached from the mobile equipment, such as for example in the event of a breakage of rod 24. The various plates and brackets may be mounted on the second frame structure by welding, machine bolts or other conventional means.

Persons skilled in the art will appreciate from the foregoing description that the various elements of the auxiliary load-carrying apparatus of the present invention, including the first and second frame structures, steel plates, retaining rod and pivotable support member easily may be fabricated from inexpensive, readily available tubular or plate stock by conventional rough-cut methods. The various elements of the auxiliary loadcarrying apparatus need not be subjected to fine machine finishing operations, with the possible exception of basic deburring and grinding steps to remove potentially hazardous burrs and surface roughness. The wheels, axle assemblies, springs and shock absorbers mounted on the second frame structure are all readily-available shelf items which easily may be installed in a conventional manner by welding, machine bolts or other conventional means.

Persons skilled in the art will further appreciate from the above disclosure that adaptive modifications readily may be made to the auxiliary load-carrying apparatus depending upon the specific mobile equipment with which it is to be utilized. For example, one of any number of possible wheel arrangements may be utilized in conjunction with the detachable second frame structure, holding and longitudinal retaining means for support member 31 may be constructed directly into second frame structure 21 in lieu of steel plates 33, 33' and 34, and other detachable connecting means may be substituted in lieu of rod 24, washer 25 and retaining pin 26. Similar adaptive modifications will be readily apparent from the above discussion.

Figure 6:
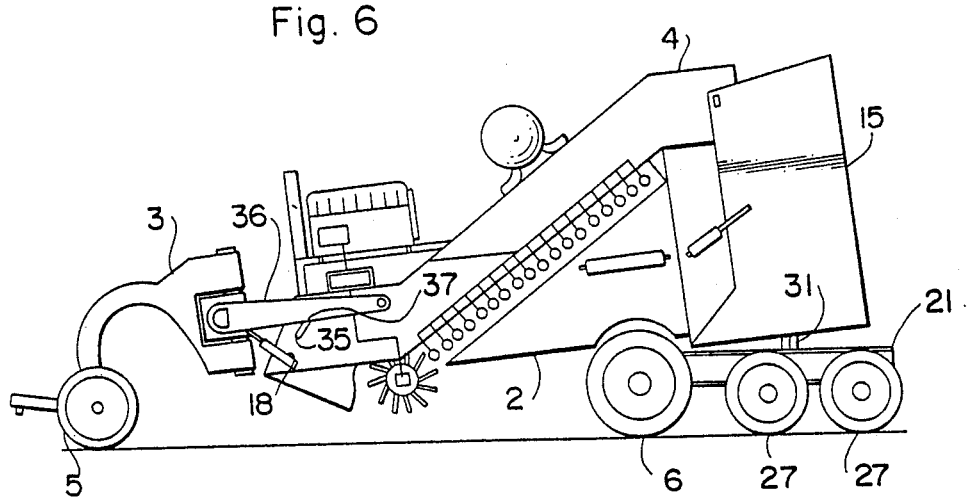
FIG. 6 is an elevation view of mobile equipment for uprooting vegetation from the ground, with the auxiliary loadcarrying apparatus of the present invention fully attached thereto.

The auxiliary load-carrying apparatus of the present invention is as simple to utilize as it is to manufacture. For transporting the mobile equipment on the highway to a job site, frame tilting hydraulic rams 18 are operated such that uprooting mechanism 9 is positioned just above the surface of the ground, and the mobile equipment is backed over the detachable second frame structure 21. Once holes 23 of second frame structure 21 are aligned with holes 22 of first frame structure 19, rod 24 is passed through the holes and retained in place with washer 25 and retaining member 26. Frame tilting hydraulic rams 18 are then again operated to lift uprooting mechanism 9 even further off the ground as shown in FIG. 6, thereby engaging pivotable supporting member 31 with steel plates 33 on second frame structure 21. A member 35, such as a pivotable latch which engages with various notches 37 in arm 36 extendinq from forward end 3 of the mobile equipment, may be utilized to maintain or lock a given position of frame tilting hydraulic rams 18.

By varying the height of uprooting mechanism 9 above the ground by means of the operation of frame tilting hydraulic rams 18 (i.e., by varying the relative tilt of the rearward portion 4 of frame 2 of the mobile equipment with respect to front portion 3 and the ground), the weight of the mobile equipment may be variously distributed between the front and rear wheels 5 and 6 of the mobile equipment and the wheels 27 of the auxiliary load-carrying apparatus. As will be appreciated, pivotable supporting member 31 facilitates the tilting movements and load distribution of the mobile equipment upon the auxiliary load-carrying apparatus, and steel plates 33, 33' provide for greater maximum relative tilt. As will be further appreciated, once the mobile equipment arrives at the next job site, reverse procedures may be implemented to easily detach the second frame structure from the mobile equipment to prepare the mobile equipment for field use again.

In accordance with the above, a detachable auxiliary load-carrying apparatus is provided which is simple to construct and utilize in conjunction with mobile field equipment. By combining a relatively simple and inexpensive detachable second frame structure with the hydraulic tilting capability already present on the mobile equipment, an auxiliary load-carrying apparatus is achieved without the need for its own weight distribution varying equipment and without other complicated mounting and operational hardware.

Obviously, many modifications and variations to the disclosed detachable auxiliary load-carrying apparatus are possible in light of the above teachings. It is therefore to be understood that, within the scope of the appended claims, the invention may be practiced otherwise than as specifically described. For example, the various aspects of the invention may be selected for combination in a number of permutations other than those shown and described. Thus, while only certain embodiments of the invention have been specifically described herein, it will be apparent that numerous modifications may be made thereto without departing from the spirit and scope of the invention.

What is claimed is:

1. A detachable auxiliary load-carrying apparatus for mobile equipment comprising:
   first frame structure fixed to said mobile equipment;
   second frame structure detachably connectable to said first frame structure and having at least one pair of wheels rotatably mounted thereon;
   means for detachably connecting said first frame structure to said second frame structure; and
   means on said mobile equipment for varying the distribution of weight between wheels on the mobile equipment and said wheels on said second frame structure by tilting a portion of the mobile equipment, said weight distribution varying means comprising at least one frame tilting hydraulic ram extending between forward and rearward portions of said mobile equipment.

2. The apparatus of claim 1, said first and second frame structures including corresponding holes, and said detachably connecting means comprising a rod capable of being passed through said holes and retained in place with a retaining pin.

3. The apparatus of claim 1, said first frame structure being located substantially between rear wheels of said mobile equipment.

4. The apparatus of claim 1, said first frame structure conforming in shape to and partially surrounding a portion of said second frame structure.

5. The apparatus of claim 4, said first frame structure and said portion of said second frame structure being tapered.

6. The apparatus of claim 1, said second frame structure including four pairs of wheels rotatably mounted thereon.

7. The apparatus of claim 1, further comprising means for maintaining a tilt position of said portion of said mobile equipment.

8. The apparatus of claim 1, further comprising means for pivotably supporting said portion of the mobile equipment on said second frame structure.

9. The apparatus of claim 8, said pivotably supporting means being fixed to a portion of said mobile equipment rearward of said first frame structure.

10. The apparatus of claim 8, further comprising means for holding said pivotably supporting means above said second frame structure.

11. The apparatus of claim 10, said pivotably supporting means comprising at least one channel member, and said holding means comprising at least one steel plate mounted on each side of said second frame structure.

12. A detachable auxiliary load-carrying apparatus for mobile equipment for uprooting vegetation from the ground, said mobile equipment including front and rear wheels, said apparatus comprising:
   first frame structure fixed to a rearward portion of said mobile equipment;
   second frame structure detachably connectable to said first frame structure and having at least one pair of wheels rotatably mounted thereon;
   means for detachably connecting said first frame structure to said second frame structure;
   means fixed to a rearward portion of said mobile equipment for pivotably supporting said rearward portion of said mobile equipment on said second frame structure; and
   means on said mobile equipment for varying the distribution of weight between said front and rear wheels of said mobile equipment and said wheels on said second frame structure by tilting said rearward portion of said mobile equipment.

13. A detachable auxiliary load-carrying apparatus for mobile equipment for uprooting vegetation from the ground, said mobile equipment including front and rear wheels and a rear collecting container, said apparatus comprising:
   first frame structure fixed to a rearward portion of said mobile equipment, and including a first pair of opposing holes;
   second frame structure detachably connectable to said first frame structure, having at least one pair of wheels rotatably mounted thereon, and including a second pair of opposing holes;

a rod capable of being passed through said first and second pairs of opposing holes to detachably connect said first frame structure to said second frame structure, and a retaining pin for retaining said rod in said first and second pairs of holes;

means fixed to an underside of said rear collecting container for pivotably supporting said rearward portion of said mobile equipment on said second frame structure; and at least one hydraulic ram extending between a forward portion of said mobile equipment and said rearward portion of said mobile equipment for varying the distribution of weight between said front and rear wheels of said mobile equipment and said wheels on said second frame structure by tilting said rearward portion of said mobile equipment.

* * * * *